United States Patent [19]
Parkin, Jr. et al.

[11] 3,891,612
[45] June 24, 1975

[54] POLYMERIZED ROSIN PRODUCT AND PROCESS FOR THE PRODUCTION OF SAME

[75] Inventors: Bernard A. Parkin, Jr.; Walter H. Schuller, both of Lake City, Fla.

[73] Assignee: The United States of America as represented by the Secretary of Agriculture, Washington, D.C.

[22] Filed: Mar. 5, 1973

[21] Appl. No.: 337,792

[52] U.S. Cl. ............... 260/99.5; 260/97.5; 260/399
[51] Int. Cl.² ...................... C08H 11/00; C09F 1/00
[58] Field of Search ........................... 260/99.5, 97.5

[56] References Cited
UNITED STATES PATENTS
2,124,675   7/1938   Rummelsburg .................... 260/99.5

FOREIGN PATENTS OR APPLICATIONS
556,392   10/1943   United Kingdom ............... 260/99.5
557,512   11/1943   United Kingdom ............... 260/99.5

Primary Examiner—Melvyn I. Marquis
Assistant Examiner—William E. Parker
Attorney, Agent, or Firm—M. Howard Silverstein; Max D. Hensley

[57] ABSTRACT

Rosin or resin acids are polymerized in reaction mixtures of sulfuric acid, water, and acetic acid in such proportions that the rosin or resin acids are readily soluble and the polymerized rosin or resin acids are of limited solubility separating in a polymer-rich layer which may be removed for isolation of the polymerized rosin. Adding more rosin to the mixture produces more polymer-rich layer and thereby the process is continuous. The fractionation of polymerized rosin or resin acids into a high-melting resin having a molecular weight indicating it to be a dimer and a low melting fraction containing monomer and dimer has also been accomplished through solvent extraction.

10 Claims, No Drawings

POLYMERIZED ROSIN PRODUCT AND PROCESS FOR THE PRODUCTION OF SAME

A non-exclusive, irrevocable, royalty-free license in the invention herein described, throughout the world for all purposes of the United States Government, with the power to grant sublicenses for such purposes, is hereby granted to the Government of the United States of America.

Polymerized rosin is currently an item of commerce having utility in the manufacture of varnishes, printing inks, and other products. For many of these uses, it is advantageous to the manufacturer to use the highest melting resin compatible with his process and as a result much effort has been expanded toward the end of increasing the melting point of rosin. The utility of the products of the current process is therefore obvious.

This invention relates to a new process for the polymerization of rosin and/or resin acids and the products obtained from this process.

The combination of sulfuric acid, water, and acetic acid in proper proportions leads to a polymerization system possessing the property of limited solubility power toward polymerized rosin. Crude rosins or monomeric abietic-type acids dissolve readily and polymerize. As the polymer concentration rises, its solubility in the reaction mixture is exceeded and a polymer-rich layer separates. The polymer-rich layer may be separated and freed of catalyst and acetic acid by neutralizing the sulfuric acid with sodium acetate and distilling the acetic acid to recover the polymerized rosin as a residue or by water washing in the presence of an immisible solvent such as an ether or a hydrocarbon or by other suitable solvent to remove both the catalyst and acetic acid and subsequent evaporation of the solvent to recover the polymerized rosin as a residue. A further amount of polymerized rosin containing a lower percentage of polymerized resin acids can be obtained from the remaining reaction mixture by much the same isolation procedure as used with the polymer-rich layer. The material obtained from the remaining reaction mixture is generally of lower softening point and darker in color than that obtained from the polymer-rich layer.

The procedure of isolating the polymerized rosin from the remaining reaction mixture is generally not the preferred process since by the addition of more untreated rosin or monomeric resin acids of abietic type, further amounts of polymer-rich layer will separate and can be removed and worked up as before. By this procedure a relatively large amount of rosin or resin acid can be polymerized by a given reaction mixture. As some of the catalyst and acetic acid are carried with the polymer-rich layer, the replacement of these materials is all that is necessary in order to make the process continuous. With crude rosins run in the continuous manner it is desirable to remove the solvent phase or remaining reaction mixture from the reactor at a slow rate in order to avoid the build-up of foreign matter which can eventually impede the reaction process. Such removal is compensated by addition of fresh catalyst-acetic acid mixture at a corresponding rate.

The polymer-rich layer from the continuous process may be subjected to either of the purification procedures used in the batch process. The neutralization and distillation procedure is generally the preferred method since it avoids the separation of large amounts of water from the acetic acid.

The rate of polymer formation is dependent upon several factors among which are the temperature of the reaction mixture, catalyst strength (strength being defined here as the ratio of $H_2SO_4$ in the catalyst) and concentration (concentration being defined as the volume of catalyst per unit volume of acetic acid). While polymer formation can be obtained at virtually any catalyst strength which allows formation of the sulfuric acid-resin acid complex (recognized by those skilled in the art as the active catalytic agent), too high an acid strength will not give separation of the polymer-rich layer and too low a catalyst strength will not allow adequate solubility of the rosin or resin acids. The catalyst strength can vary from 95% $H_2SO_4$ and 5% $H_2O$ to 50% $H_2SO_4$ and 50% $H_2O$ by weight. The catalyst concentration may be varied over a wide range from one part of the aqueous sulfuric acid and 100 parts of acetic acid by volume. Optimum concentration appears to be within the range of 30 ml to 70 ml of catalyst per liter of acetic acid.

The polymerization can be run at any convenient temperature generally ranging from room temperature to 118°C but temperature in the range of 30° to 80°C appear to give adequate rates of conversion without excessive side reactions.

The rate of addition of untreated rosin and withdrawl of dimerized product under a given set of conditions will determine the degree of conversion to polymer obtained. The faster the withdrawal and addition, the shorter the contact time and the lower the dimer content of the product. Shorter contact times also reduce the amount of higher melting polymer obtained under a given set of conditions.

Another property of this polymerization system appears as higher melting material contained mainly in the polymer-rich layer which can be isolated by the simple expedient of dissolving it in 2 to 3 parts of isooctane and diluting with isooctane until no further precipitation occurs. The precipitate is isolated by filtration and evaporation of adhering solvent. Generally a dark powder is obtained which can be melted to a resinous solid at about 200°C. The filtrate can be evaporated to obtain a resinous residue of much lower melting point containing most of the monomeric, dimeric, and some trimeric species originally present.

The following examples are given to illustrate various applications of the invention and are in no way intended to limit it.

EXAMPLE 1

One gram of abietic acid was dissolved in 20 ml of glacial acetic acid and 1 ml of 80% aqueous sulfuric acid was added. The homogenous reaction mixture was allowed to stand at room temperature for 90 hours. An immiscible liquid was observed in the mixture. After 140 hours the immiscible layer yielded 0.2 g of resin which analyzed 91% dimer acids by the method of Sinclair, Hinnenkamp, Boni, Berry, Schuller and Lawrence, *J. Chromatog. Sci.*, 9, 126 (1971). Dilution of the remainder of the reaction mixture with ether and washing with water to a pH of 6, removed the sulfuric acid and acetic acids. The ether solution was dried with anhydrous sodium sulfate and evaporated to recover 0.96 g of resinous product which analyzed at 78% dimer acids by the above procedure.

EXAMPLE 2

A mixture of 1700 ml of glacial acetic acid, 85 ml of concentrated sulfuric acid, 42 ml of water (78.5% $H_2SO_4$.21.5% $H_2O$) and 143 g of WW gum rosin was made up. The homogenous mixture was placed in an apparatus constructed from a 2 liter three-neck flask having a side arm of 500 ml capacity attached by tubing in such manner that material was circulated through the side arm by the action of a paddle-type stirrer operating in the bottom of the flask. The temperature of the mixture was maintained at 50°C by means of a heat lamp and the mixture was stirred so as to maintain a slow circulation through the side arm of the apparatus. After 4 hours an immiscible layer had begun to collect at the top of the side arm. Product was withdrawn from the side arm and rosin was added to the flask as the reaction proceeded. After 1000 g of rosin had been added to the apparatus, 598 g of dimerized rosin were obtained from the immiscible phase withdrawn. The dimerized rosin analyzed to contain 50% dimer acids. Isolation of the material remaining in the reaction mixture gave 311 g of material containing 22% dimer acids.

EXAMPLE 3

A mixture of 1700 ml glacial acetic acid and 100 ml of 70% aqueous sulfuric acid (70 g $H_2SO_4$.30 g $H_2O$) were placed in the apparatus described in Example 2. Tall oil rosin was added continuously through an automatic solids-addition funnel. After about 3 hours a polymer-rich phase began to separate in the side arm. As this material collected, it escaped the reaction flask through an overflow tube. As the polymer-rich layer collected, the solvent phase or remaining reaction mixture was drawn off in equal volume. The level of solvent or remaining reaction mixture in the reactor was maintained by simultaneous addition of more acetic acid-aqueous-sulfuric acid mixture. After about 24 hours a steady state was developed and sampling was started. Over a period of 16 hours 300 grams of tall oil rosin were added to the reactor and polymer-rich phase and solvent or remaining reaction mixture were withdrawn in such quantity that when the products were isolated by established procedures 214.2 g of resin were obtained from the polymer-rich phase and 76.1 g of resin were obtained from the solvent or remaining reaction mixture. The material from the polymer-rich phase exhibited the following properties, softening point-ring and ball 91.1, Neutral equivalent 390, Color E, Dimer acid content 26%, Isooctane insoluble 16%. The material from the solvent phase exhibited the following properties, softening point-ring and ball 84, Neutral equivalent 388, Color D+, Dimer content 17%, Isooctane insoluble 6%.

EXAMPLE 4

One hundred grams of a polymerized gum rosin obtained from WW gum rosin by polymerization in acetic acid solution using sulfuric acid catalyst, softening point-ring and ball 142, % dimer 51.5, neutral equivalent 364, was dissolved in 100 ml of isooctane by warming on the steam bath. After complete solution was obtained, the solution was diluted to 850 ml with isooctane and allowed to stand until precipitation was complete. Filtration gave 30 g of powder which gave a capillary melting point of 200–220, neutral equivalent of 372 and a molecular weight of 568. Evaporation of the filtrate gave a resin having ring and ball softening point of 121.5, neutral equivalent of 368, and molecular weight of 581.

We claim:

1. A process for the production of a polymerized composition which process comprises:
    dissolving a material selected from the group consisting of rosin, resin acids and a resin acid in a mixture of acetic acid, sulfuric acid, and water and reacting said material in said mixture, wherein the proportions of acetic acid, sulfuric acid and water in said mixture are such that the unreacted material is soluble and the polymerized products of the reaction have only limited solubility and separate from the mixture in the form of a polymer-rich layer as the reaction proceeds.

2. The process of claim 1 wherein the selected material is rosin.

3. The process of claim 1 wherein the selected material is a monomeric abietic-type resin acid.

4. A process for the production of a polymerized resin composition which process comprises dissolving a material selected from the group consisting of rosin, resin acids and a resin acid in a mixture of aqueous sulfuric acid in the range of from 95% $H_2SO_4$ and 5% $H_2O$ to 50% $H_2SO_4$ and 50% $H_2O$ by weight with acetic acid in the range of from one part of the aqueous sulfuric acid and 100 parts of acetic acid by volume to 50 parts of the aqueous sulfuric acid and 100 parts of acetic acid by volume, which permits solution of the material and yields separation of a polymer-rich layer, reacting said material in said mixture at a temperature between 0° C. and 118° C. for sufficient time to allow polymerization of said material and the separation of a polymer-rich layer, separating said layer from said mixture and treating said layer and said mixture to remove acetic and sulfuric acid.

5. The process of claim 4 wherein the selected material is rosin.

6. The process of claim 4 wherein the selected material is a monomeric abietic-type resin acid.

7. A process for the production of a high melting polymer which process comprises:
    a. dissolving a material selected from the group consisting of rosin, resin acids and a resin acid in a mixture of aqueous sulfuric acid in the range from 95% $H_2SO_4$ and 5% $H_2O$ to 50% $H_2SO_4$ and 50% $H_2O$ by weight with acetic acid in the range of from one part of the aqueous sulfuric acid and 100 parts of acetic acid to 50 parts of the aqueous sulfuric acid with 100 parts of acetic acid by volume;
    b. reacting said material in said mixture at a temperature of between 0° C. and 118° C. until polymerization of said material and the separation of a polymer-rich layer begins;
    c. separating said layer from said mixture;
    d. treating said layer to remove acetic and sulfuric acids;
    e. making a concentrated solution of said layer in isooctane;
    f. diluting said concentrated solution with additional isooctane;
    g. allowing a high melting polymer to precipitate; and
    h. isolating the precipitate from said diluted solution.

8. The high melting, hydrocarbon insoluble product of the process of claim 7.

9. The process of claim 7 including the further steps of diluting with additional isooctane the solution from which the high melting polymer is isolated in step (h), allowing a low melting polymer to precipitate, and isolating the precipitated low melting polymer.

10. The lower melting, hydrocarbon soluble product of the process of claim 9.

* * * * *